United States Patent [19]

Graboyes

[11] E Re. 28,747

[45] Reissued Mar. 30, 1976

[54] METHOD AND APPARATUS FOR ENGRAVING CHARACTERS

[75] Inventor: Herman Graboyes, Cherry Hill, N.J.

[73] Assignee: Numerical Control Program Service, Inc., Moorestown, N.J.

[22] Filed: Dec. 10, 1974

[21] Appl. No.: 531,255

Related U.S. Patent Documents

Reissue of:

[64] Patent No.: 3,628,417
Issued: Dec. 21, 1971
Appl. No.: 814,684
Filed: Apr. 9, 1969

[52] U.S. Cl. ..... 90/13 C; 90/13 R
[51] Int. Cl.[2] ..... B23C 1/16
[58] Field of Search ..... 90/2, 11 C, 13 R, 13 C, 90/13.1, 13.2, 13.8, 13.9, 19, 21, DIG. 5; 408/44

[56] References Cited

UNITED STATES PATENTS

| | | | |
|---|---|---|---|
| 2,010,905 | 8/1935 | Tretbar, Jr. | 90/13.2 X |
| 2,342,129 | 2/1944 | Elbertz | 90/2 |
| 2,710,563 | 6/1955 | Messmer | 90/13 R X |
| 2,812,694 | 11/1957 | Reichard et al. | 90/13.1 |
| 2,953,949 | 9/1960 | Witzig et al. | 408/44 |
| 3,117,495 | 1/1964 | Zwick | 90/13.1 |
| 3,290,994 | 12/1966 | Garrison et al. | 90/13 C X |

*Primary Examiner*—J. M. Meister
*Assistant Examiner*—Fred A. Silverberg
*Attorney, Agent, or Firm*—Caesar, Rivise, Bernstein & Cohen

[57] ABSTRACT

A method and apparatus for engraving characters by the use of numerically controlled machine tools. The characters are engraved by moving a first machine tool about the outline of the desired character. Where the character has inside corners, a second numerically controlled machine tool is moved about the outline at the inside corner at a plurality of depths to reduce the radius of the curvature at the inside corner.

8 Claims, 24 Drawing Figures

Fig. 1.
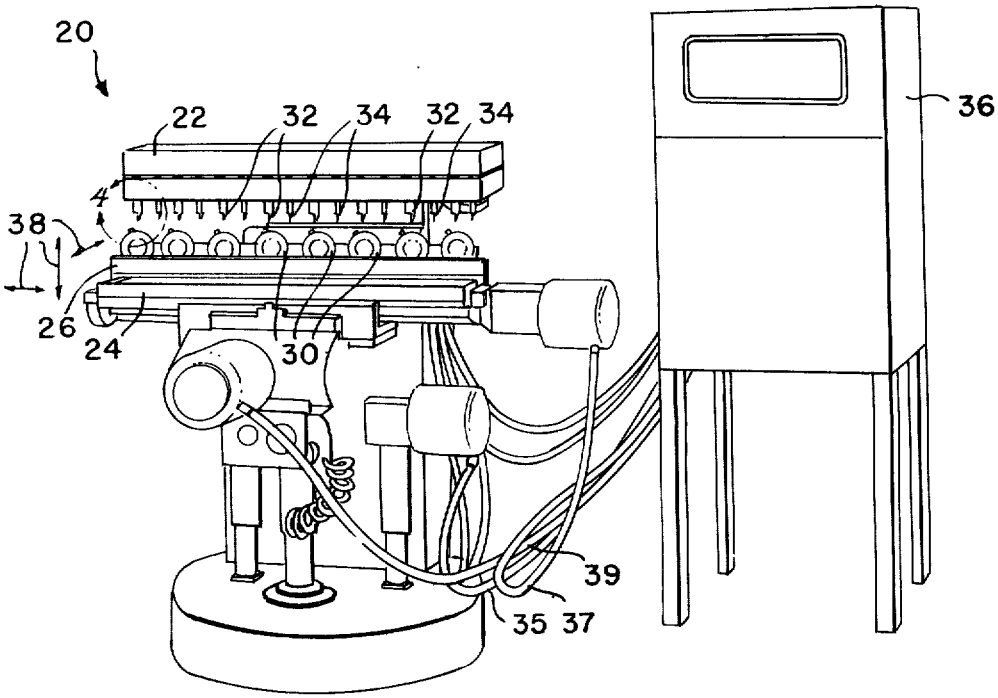
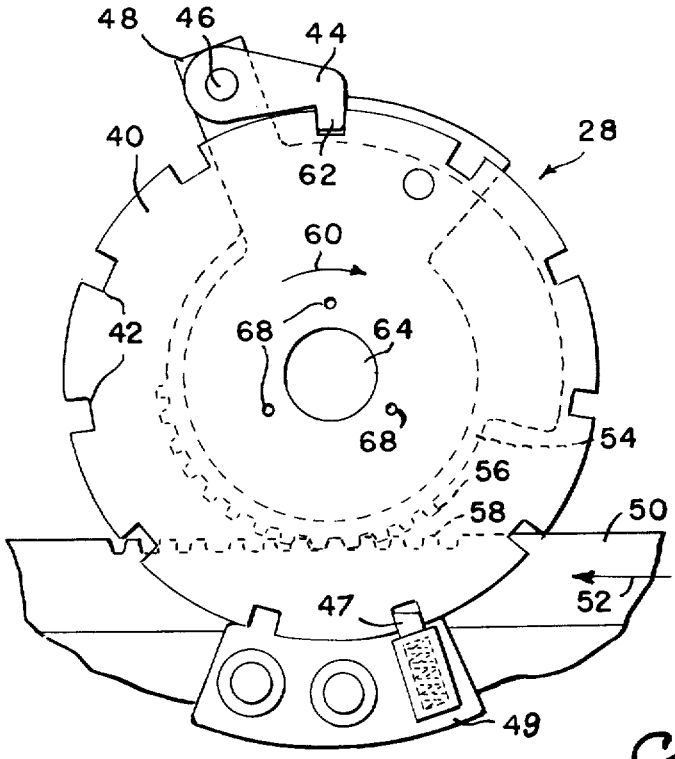
Fig. 2.
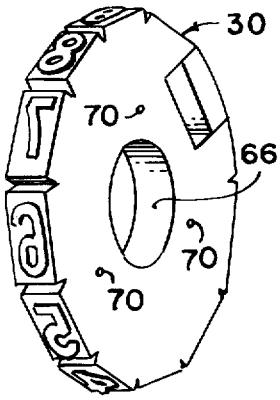
Fig. 3.
INVENTOR.
HERMAN GRABOYES
BY
Caesar, Rivise
Bernstein & Cohen
ATTORNEYS.

INVENTOR.
HERMAN GRABOYES
BY
Caesar, Rivise, Bernstein & Cohen
ATTORNEYS.

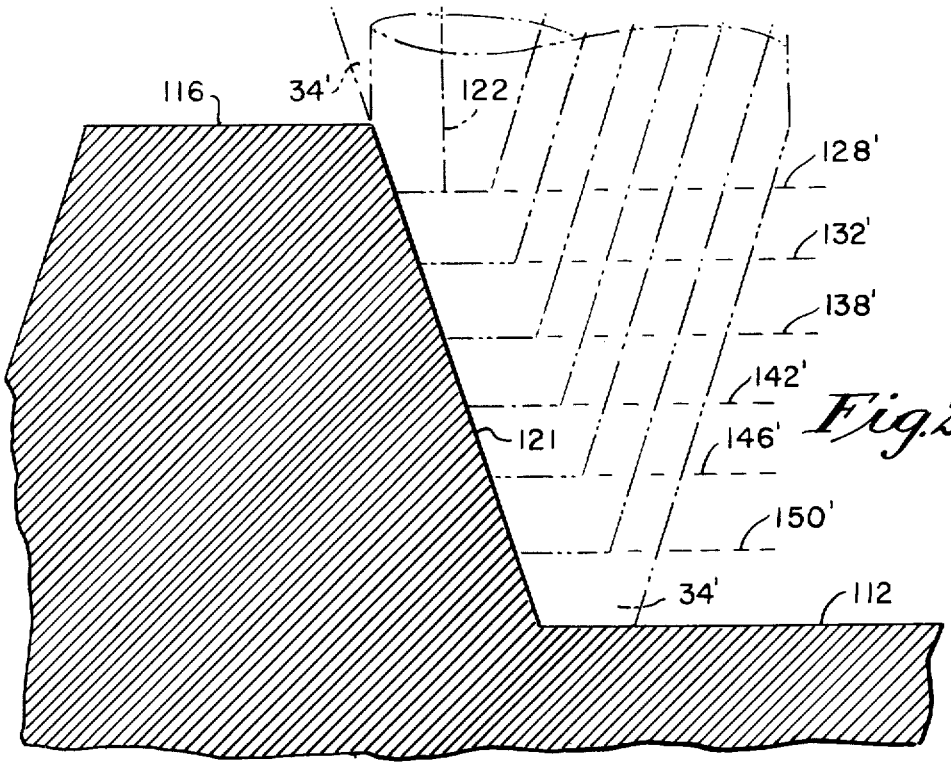
Fig. 24
Fig. 5.
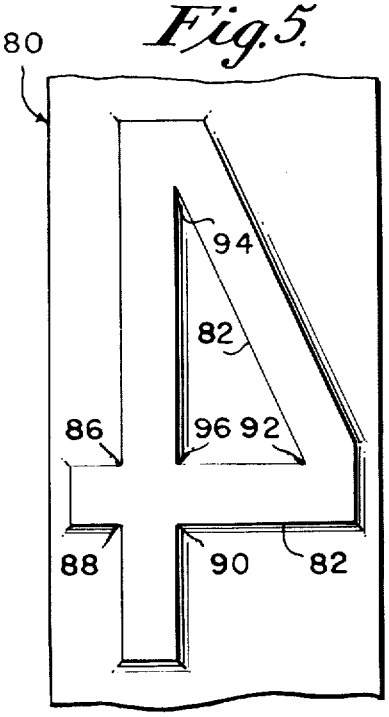
Fig. 6.
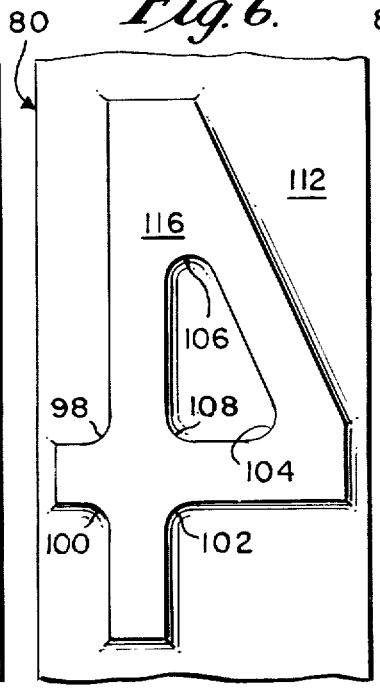
Fig. 7
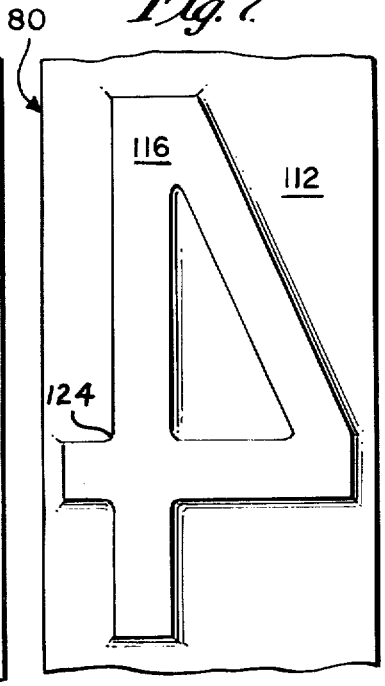
INVENTOR.
HERMAN GRABOYES
BY
Caesar, Rivise, Bernstein & Cohen
ATTORNEYS.

Fig. 8.
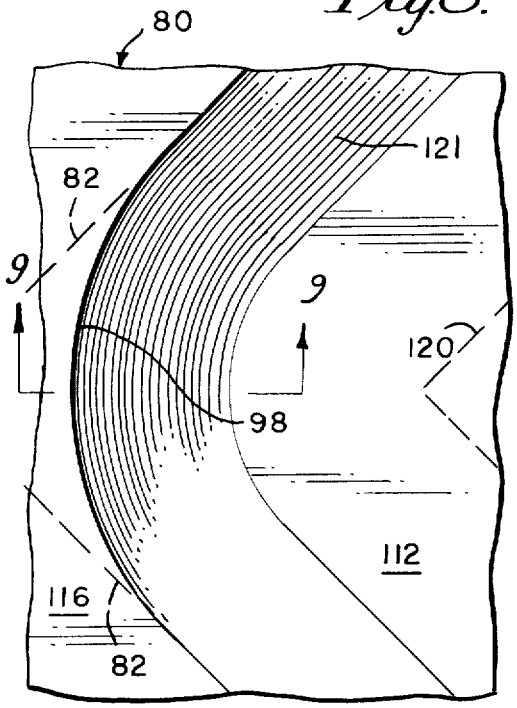
Fig. 10.
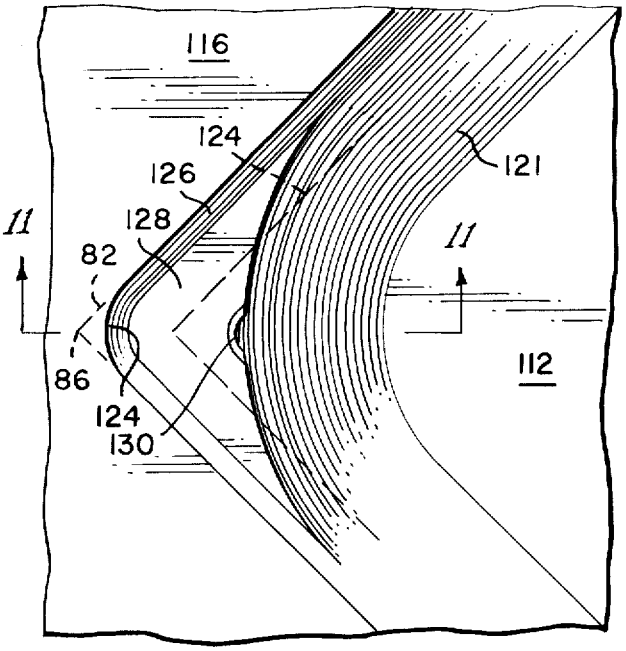
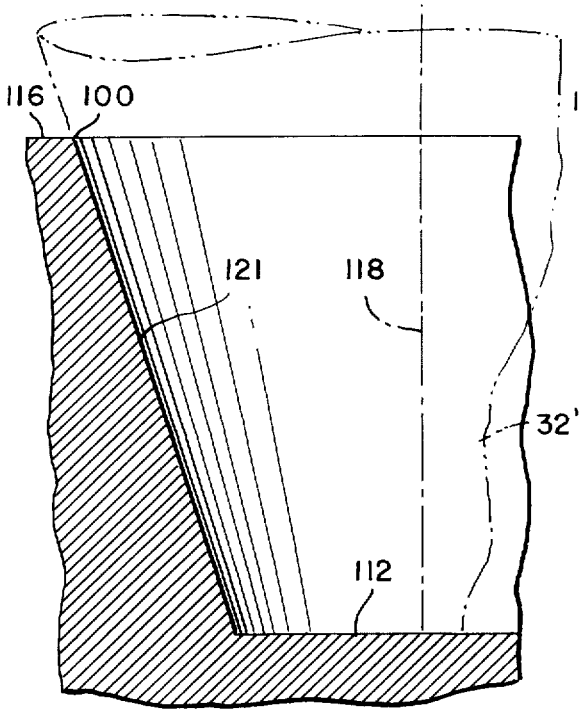
Fig. 9.
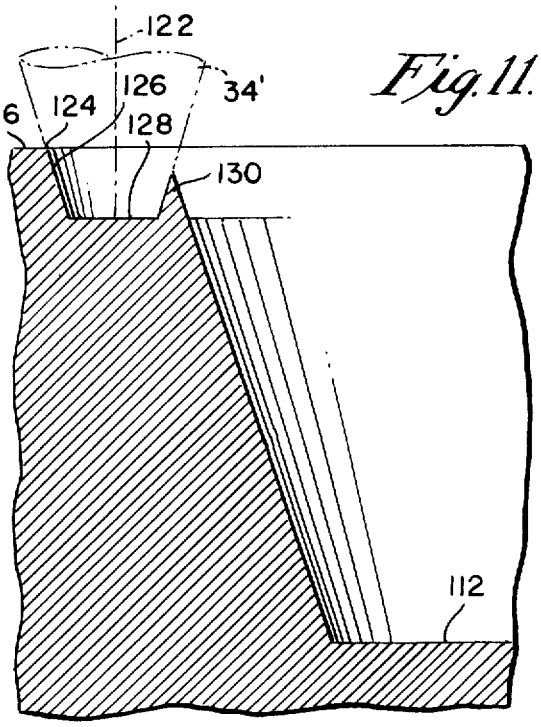
Fig. 11.
INVENTOR.
HERMAN GRABOYES
BY
Caesar, Rivise, Bernstein & Cohen
ATTORNEYS.

INVENTOR.
HERMAN GRABOYES
BY
Caesar, Rivise, Bernstein & Cohen
ATTORNEYS.

INVENTOR.
HERMAN GRABOYES
BY
Caesar, Rivise, Bernstein & Cohen
ATTORNEYS.

INVENTOR.
HERMAN GRABOYES
BY
Caesar, Rivise, Bernstein & Cohen
ATTORNEYS.

METHOD AND APPARATUS FOR ENGRAVING CHARACTERS

Matter enclosed in heavy brackets [ ] appears in the original patent but forms no part of this reissue specification; matter printed in italics indicates the additions made by reissue.

This invention relates generally to a method and apparatus of engraving and more particularly to a method and apparatus for engraving characters with numerically controlled machine tools.

There are many applications in which characters and designs must be engraved with extreme accuracy. In many of these cases, hand-controlled tools are not accurate enough in that the variations in size and shape as between a plurality of similar characters or designs cannot be tolerated.

For example, numerical printing wheels which each include the numbers zero through nine which are used in consecutive numbering of tickets or currency, must have consistent as well as uniform characters on each of the decade printing wheels which are used.

Numerically controlled machine tools have been employed for engraving the characters on these wheels. However, it has been found that numerically controlled machine tools cannot provide a small enough radius on the inside corners of characters or designs. That is, on numbers like the number two and the number four wherein there are inside corners in the character, the provision of a large radius on the inside corner causes the character to look irregular. In order to make the character look right, there must be a small radius at the inside corner so that the corner looks sharp.

Even with a very fine cutting tool, numerical control machines cannot make the radius of the inside corners small enough. Moreover, when extremely fine cutting tools are used the cutting tools wear out quickly and the time required to engrave a character is too long because the cutting tool is too small to quickly remove the large areas of excess material about the character.

It is therefore an object of the present invention to overcome the aforementioned disadvantages.

Another object of the invention is to provide a new and improved method of engraving characters by numerically controlled machine tools.

Another object of the invention is to provide a new and improved method of engraving of embossed characters with a numerically controlled machine tool device which includes the engraving of the character with a first cutting tool to remove the major portions of excess material about the character and a fine cutting tool to clear the excess areas in the inside corners of the characters.

Still another object of the invention is to provide a new and improved method for engraving the inside corners of embossed characters with a numerically controlled machine tool which comprises the steps of successively lowering the cutting tool with respect to the land of the character and following the outline of the character at each of the depths.

Still another object of the invention is to provide a new and improved apparatus for engraving characters.

Yet another object of the invention is to provide a new and improved apparatus for engraving characters which includes a large cutting tool and a fine cutting tool and a movable support for the member in which the character is to be engraved.

Yet another object of the invention is to provide a new and improved apparatus for engraving embossed characters which includes a plurality of cutting tools of a first size and a plurality of cutting tools of a second size and a plurality of supports for members to be engraved.

These and other objects of the invention are achieved by providing a new and improved method and apparatus for engraving the inside corners of embossed characters which consists of providing a cutting tool; positioning the tip of the cutting tool at a plurality of successive depths with respect to the land of the character; moving the tool with respect to the character about the desired outline of the character so that the axis of the tool at each of the depths is spaced from the borderline of the character a distance equal to the radius of the tool in the plane of the land of the character. In this manner, the radius on the inside corner is reduced to the radius of said tool in the plane of the land of the character when the tip of the tool is at a depth with respect to the land of the character which is the smallest of the successive depths of the tool.

Other objects and many of the attendant advantages of this invention will be readily appreciated as the same becomes better understood by reference to the following detailed description when considered in connection with the accompanying drawings wherein:

FIG. 1 is a perspective view of a numerically controlled machine tool device embodying the invention;

FIG. 2 is an enlarged diagrammatic side elevational view of the indexing device providing the support for the wheels which are to be engraved;

FIG. 3 is an enlarged perspective view of a printing wheel having engraved numerals thereon;

FIG. 5 is an enlarged top plan view of an idealized embossed character numeral 4;

FIG. 6 is an enlarged top plan view of an embossed character numeral four engraved by a conventional numerically controlled machine tool procedure;

FIG. 7 is a top plan view of an embossed character numeral four engraved with the method and apparatus embodying the invention;

FIG. 8 is an enlarged top plan view taken in the area 8 designated in FIG. 4 after a first cutting tool has been utilized to engrave the embossed character numeral four;

FIG. 9 is a sectional view taken along the line 9—9 in FIG. 8;

FIG. 10 is an enlarged top plan view taken in the area 8 designated in FIG. 4 after a fine cutting tool has followed the outline of the character numeral four at a first depth;

FIG. 11 is a sectional view taken along the line 11—11 in FIG. 10;

FIG. 24 is a sectional view taken along the line 4—24 in FIG. 22;

Referring now in greater detail to the various figures f the drawing wherein similar reference characters efer to similar parts a numerically controlled machine ool device is shown generally at 20 in FIG. 1.

Figure 4:
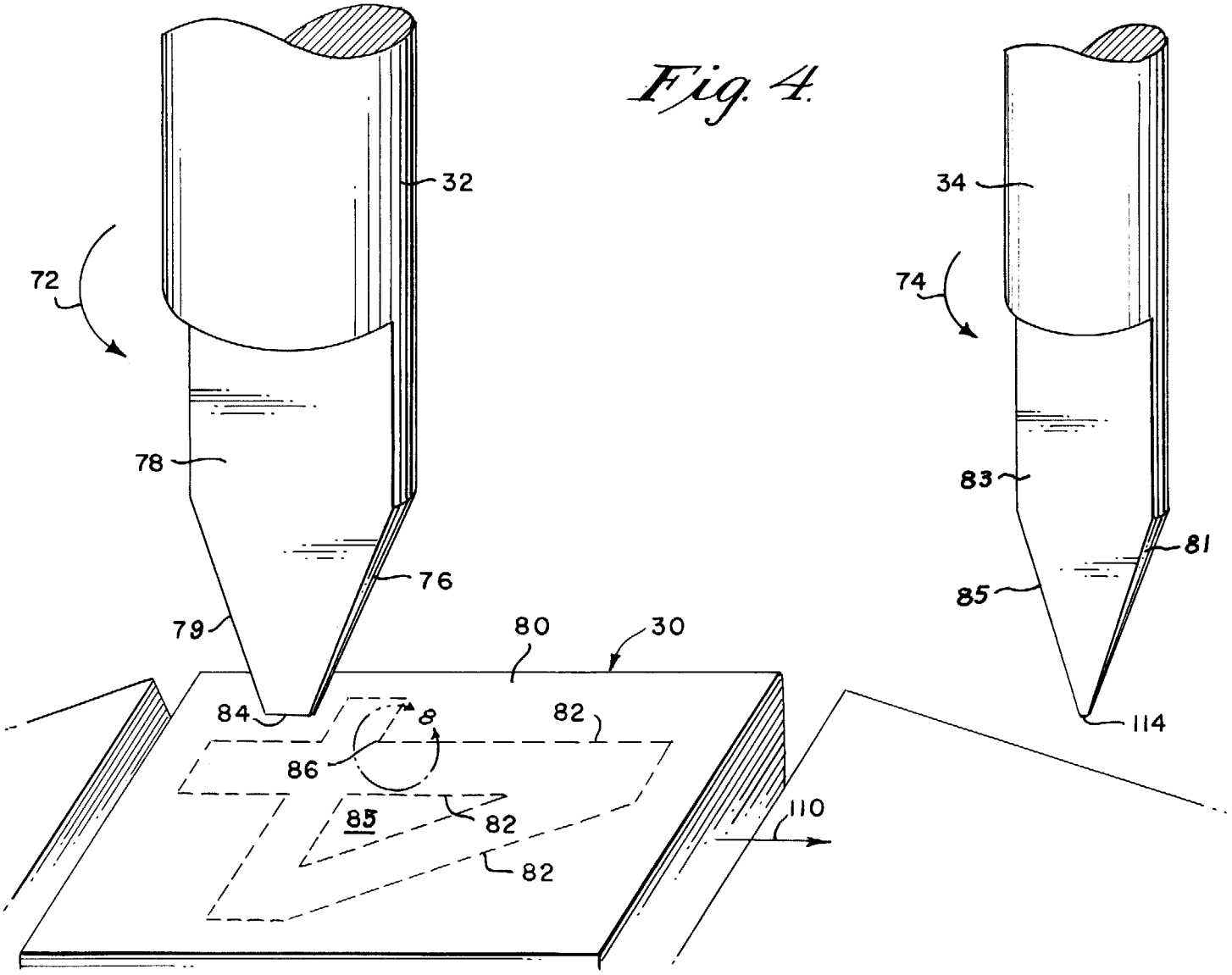
FIG. 4 is an enlarged perspective view taken in the area designated 4 in FIG. 1.

Machine tool device 20 basically comprises a housing 2 for supporting and rotating eight pairs of cutting ools. The machine tool device also includes a support nember 24 which supports a housing 26 which in- cludes a plurality of indexing devices (FIG. 2) each of which supports a printing wheel 30.

As set forth above, the housing 22 includes eight pairs of cutting tools. Each pair of cutting tools in- cludes a heavy duty cutting tool 32 and a fine cutting ool 34. A console 36 is also provided which houses the unched tape or other form of numerical control pro- gram. The console 36 also includes conventional equip- nent for reading out the instructions from the program and providing the necessary signals via lines 35, 37 and 39 to the machine tool device 20 which cause the sup- port member 24 to be moved in accordance with the nstructions provided in the numerical control pro- gram.

As diagrammatically denoted by arrows 38 in FIG. 1, the support 24 moves three dimensionally. That is, it is movable in both the x and y coordinates horizontally as well as the z coordinate vertically. In addition, the indexing devices 28 rotate the printing wheels 30 after each character has been engraved.

As best seen in FIG. 2, the indexing device 28 basi- cally comprises a circular disc 40 which has a plurality of indexing notches 42 which are equally spaced about the periphery of the disc. A pivotable latching finger 44 is also provided. Latching finger 44 is pivotably mounted about a pin 46 which is secured to a fixed member 48. The latching finger 44 is pivoted in a coun- terclockwise direction, as seen in FIG. 2, after a char- acter has been engraved on one surface of the engrav- ing wheel 30. An indexing finger 47 is mounted in a stationary member 49 having an opening for slidably securing the indexing finger 47. The indexing finger is moved downwardly out of the slot 42 after a character has been completely engraved.

As soon as the latching finger 44 and the indexing finger [46] *47* are moved out of the slots 42, the disc 40 is driven in a clockwise direction by a gear drive bar 50 which is moved in the direction of arrow 52. Se- cured to the rear side of disc 40, as seen in FIG. 2, is a concentrically mounted gear 54 having teeth 56 spaced about the periphery thereof. The teeth 58 on gear drive bar 50 are aligned with engaged teeth 56 so that when the bar is drawn in the direction of arrow 52, the index disc 40 is rotated in the direction or arrow 60.

As soon as the disc 60 starts to rotate, finger 44 is again urged against the periphery of the disc 40 until the next notch 42 is reached. As soon as the next notch 42 is aligned with the end 62 of finger 44, the end is inserted into the notch 42 thereby stopping the motion of the index disc 40. As soon as the movement of the disc 40 has stopped, the finger 47 is reinserted into the notch 42. The finger 47 is substantially equal in width to the indexing notch 42, and thereby causes an accu- rate placement of the indexing disc each time.

The disc 40 includes on its forward surface, as seen in FIG. 2, a shaft 64 upon which is mounted the printing wheel 30. The shaft 64 projects transversely from the surface of disc 40.

The printing wheel 30 includes a circular opening 66 at the center thereof. Opening 66 is substantially the same diameter of shaft 64 so that the printing wheel may be press fit over the shaft 64 and stationarily mounted onto the rod 64. As set forth above, the hous- ing 26 includes eight indexing devices 28 so that eight printing wheels 30 can be mounted onto the housing 26 for simultaneous engraving.

It should also be understood that fingers 44 and [46] *47* are controlled by the numerical control program in the console 36. After a character has been completely engraved by the cutting tools 32 and 34, the control automatically causes each of the fingers 44 and 47 of each of the indexing devices 28 to be unlatched from the notches 42. The bar [70] *50* is then moved in the direction of arrow 52 to cause rotation of the indexing devices 28 which are each linked to the bar. Similarly, the same program causes the latching and indexing fingers 44 and 47 to be released from the notches 42 after all of the characters on a printing wheel have been printed.

The notches 42 on each of the indexing devices en- able the shafts 64 to each be rotated the same angular distance each time the bar 50 is actuated. The latching fingers 44 stop the rotation of the shafts 64 by engaging the next notches 42. The indexing fingers 47 are then urged into the notches 42 causing an exact positioning of the shaft 64.

The operation of the device 20 is automatically ter- minated after an entire wheel 30 has been engraved. The device is out of operation until such time as all of the engraved printing wheels have been removed and blank printing wheels placed on each of the shafts 64 of the indexing devices. The printing wheels 30 are aligned on the shaft 64 by nipples 68 which are pro- vided about shaft 64 on the front surface of disc 40. The nipples are provided to engage detents 70 which are provided in the rear face of the printing wheels 30. The alignment of the printing wheel 30 on the shaft 64 insures that the surface of the wheel 30 which is being engraved is substantially horizontally disposed at the time that the cutting tool is engraving a character thereon.

As best seen in FIG. 4, a pair of cutting tools 32 and 34 are provided above and adjacent each of the printing wheels 30. The cutting tools 32 and 34 are each utilized in a similar manner. That is, each of the tools 32 and 34 are rotated in the direction of arrows 72 and 74, respectively. Cutting tool 32 is of a larger diameter than cutting tool 34 so that larger areas may be cut out of the top surface of the printing wheel 30 to engrave the characters. The cutting tool 32 is substantially cylindrical and includes at its lowermost surface a tip which is comprised of a tapered end 76. The end 76 comprises a semicylinder as a result of the cutting tool having a planar vertical surface 78 along the diameter of the cutting tool 32. The end 76 of the cutting tool 32 is frustoconically shaped. The edge 79 is the cutting edge of the tool and extends at an angle with respect to the vertical longitudinally extending axis of the shaft 32 which is desired as the slope on the sidewalls of the character to be engraved on the horizontal platform 80 of the printing wheel 30.

As set forth above, the cutting tool 34 is of a smaller diameter than cutting tool 32. The end 81 of the cutting tool 34 is substantially semicylindrical as a result of the planar diametrically extending vertical surface 83 which includes a cutting edge 85. The cutting edge 85 is inclined with respect to the axis of the cutting tool 34 at the same angle as cutting edge 79 of tool 32. The lower portion of end 81 is thus also frustoconically shaped.

As indicated in phantom, the desired character to be engraved on the platform 80 is the numeral 4. The dotted line 82 thus represents the idealized or desired borderline of the character numeral 4. As best seen in FIG. 5, an ideal numeral 4 would be made exactly in accordance with the character shown therein with the borderline of the engraved character following the borderline 82 exactly.

However, as best seen in FIG. 4, when the cutting tool 32 is utilized to engrave the numeral 4 so that it is embossed from the surface of platform 8, all of the material in the platform 80 outside of the borderlines 82 of the character 4, is removed down to a predetermined depth by the cutting tool 32. Thus, the lowermost surface 84 of the cutting tool 32 is lowered to a predetermined depth with respect to the platform 80 of the printing wheel 30 and then the cutting tool 32 is moved with respect to the character four about the entire platform 80 until all the material outside the borderline 82 is removed from the platform 80.

The excess material 85 which lies within the triangle in the character numeral four is removed by elevating the cutting tool 32 with respect to the character above the top surface thereof and then lowering it within the triangle. The cutting tool 32 is then moved along the internal portion of the borderline 82 with respect to the character being engraved on the platform 80.

It should be noted that the cutting tool is only rotated and not moved linearly. Rather the platform 24 which supports the printing wheel 30 is moved and the cutting tools are actually stationary. The movement of the cutting tool with respect to the printing wheel 30 is therefore caused in the preferred embodiment by the movement of the support member 26.

The embossed numeral four that is engraved on platform 80 by cutting tool 32 is best seen in FIG. 6. Whereas the inside corners 86, 88, 90, 92 and 94 of the ideal numeral four, shown in FIG. 5, are defined as the intersections of straight lines, the inside corners of the numeral four seen in FIG. 6 are rounded at 98, 100, 102, 104, 106 and 108. The reasons that the inside corners 86, 88, 90, 92, 94 and 96 cannot be squared off as the intersections of two straight lines is due to the fact that the closest that the cutting tool 32 can come to the borderline at the corners is limited by the radius of the cutting tool in the plane which coincides with the plane of the land (top surface) of the character.

Thus, after cutting tool 32 has engraved the character numeral four, as shown in FIG. 6, the platform 80 of the printing wheel 30 is moved in the direction of arrow 110 in FIG. 4. The printing wheel 30 is then placed below the finer cutting tool 34. The cutting tool 34 is then positioned at various depths with respect to the land of the character and follows the borderline 82 of the character at each of the curved portions 98, 100, 102, 104, 106 and 108 in the inside corners of the embossed character four.

The cutting tool 34 is lowered to a first depth with the lowermost point or surface 114 of the end 81 of the cutting tool 34 intermediate of the depth of the lower surface 112 of the platform 80. The lowermost point 114 of the finer cutting tool 34 is, however, below the land 116 of the character. In the first operation, the cutting tool 34 follows the outline 82 adjacent each of the corners 88 through 108. The cutting operation is then repeated at successive depths. The result is illustrated in FIG. 7. The radius of the inside corners have been substantially reduced. The numeral four engraved in accordance with the invention has become almost identical to an ideal number four.

The exact sequence of operations in accordance with the invention is best seen in connection with FIGS. 8 through 24 which show the progressive steps of the engraving of one of the inside corners of the resulting character.

FIG. 8 shows the platform 80 after the cutting tool 32 has passed adjacent corner 88 of the character numeral four. The cutting tool 32 as it follows the borderline 82 of the character travels in lines parallel to the borderlines 82. The axis 118 of the cutting tool 32 is depicted in phantom in FIG. 9. The axis of the cutting tool 32 follows a line parallel to the borderline 82. The line of the travel of axis 118 is along path 120 which is shown in phantom in FIG. 8.

Because the cutting tool 32 is rotated in order to cut away the excess material on a platform, the cutting path of the tool 32 is therefore frustoconically shaped. Since it is the shape of the cutting path that determines the material cut out of the platform, the cutting path of the tool 32 is illustrated in FIG. 9 in phantom at 32'. Similarly, the cutting path of the cutting tool 34 is illustrated in phantom at 34' in FIGS. 11, 13, 15, 17, 19, 21, 23 and 24. It should also be noted that the radius of the cutting tools 32 and 34 at various points along the ends thereof is determined by the cutting edges 79 and 85. Thus, the cutting paths of the tools are a locus of the rotation of the cutting edges of the tools.

As best seen in FIG. 9, the axis 118 is displaced from the borderline 82 in accordance with the radius of the cutting tool 32 in the plane of the land 116 of the character. Consequently, the radius of curvature which remains at portion 98 of the character four is equal to the radius of the cutting tool in the plane of the land 116 of the character. The character includes a sloping sidewall 121 which is an angle with respect to the vertical equal with the angle of the cutting edge 79 of the cutting tool 32.

The cutting tool 32 engraves an embossed character at only one depth. That is, the lowermost point 84 of the tool is moved to the plane of the lowermost surface 112 of the platform. Therefore, as the cutting tool is moved about the borderline 82 of the character, the lowermost surface 112 is formed about the periphery or sidewall 121 of the character.

After the cutting operation utilizing the cutting tool 32 has been completed, the fine cutting tool 34 is positioned with respect to the platform 80 so that it moves along the borderline 82 of the desired character. As best seen in FIGS. 10 and 11, the cutting path of tool 34 which is depicted in phantom at 34' is lowered to a depth with respect to the platform 80 which is intermediate of the lower surface 112 but lower than the land of the character 116. The axis 122 of the cutting tool 34 therefore moves parallel to the desired borderline 82 of the character. The path of the axis 122 is shown in phantom at 124 in FIG. 10. It can therefore be seen that the path 124 of the axis is spaced from the borderline 82 in accordance with the radius of the cutting tool 34 in the plane of the land of the character 116. Therefore, although the cutting tool cannot exactly approach the desired corner 86 of the character numeral four, the radius of curvature at portion 124 has been substantially reduced. The slope of the depending sidewall 126 at portion 124 is identical to the slope of sidewall 122. This is so because of the fact that the slope of the cutting angle of both cutting tools 32 and 34 are substantially equal.

It should also be noted that the lowermost surface 114 of the cutting tool 34 leaves a horizontally disposed platform at 128 as the axis 122 of the cutting tool travels along path 124. Where there is a substantial difference in the radius of the cutting tools 32 and 34, as the cutting tool moves along line 124, not all of the material at the level of platform 128 is removed from the corner of the character. As best seen in FIGS. 10 and 11, a projection 130 remains along the bisecting line of the angle of the inside corner 86.

Figure 12:
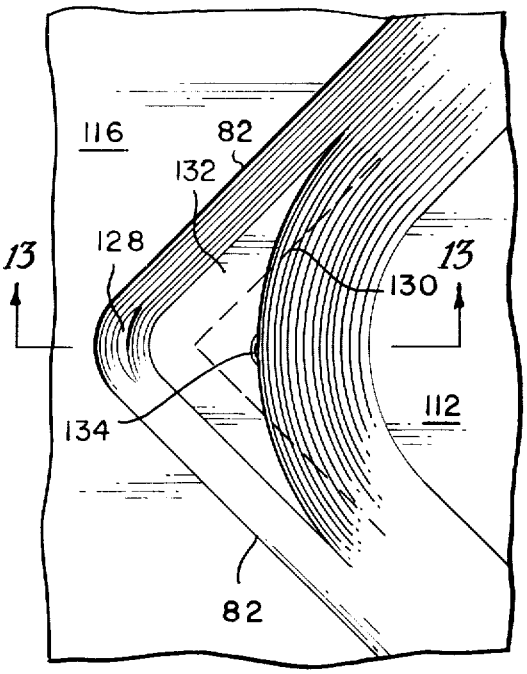
FIG. 12 is an enlarged top plan view taken in area 8 designated in FIG. 4 after the fine cutting tool has followed the outline of the character numeral four at a second depth.

After each of the inside corners have been passed by the cutting tool 34, the cutting tool 34 is lowered to a second depth which is again intermediate of the lower surface 112 but lower than the plane of platform 128. As best seen in FIG. 12, the axis 122 of the cutting tool 34 is spaced from the borderline 82 of the character in accordance with the radius of the cutting tool 34 in the plane of land 116 with cutting tool 34 at the second depth.

Figure 13:
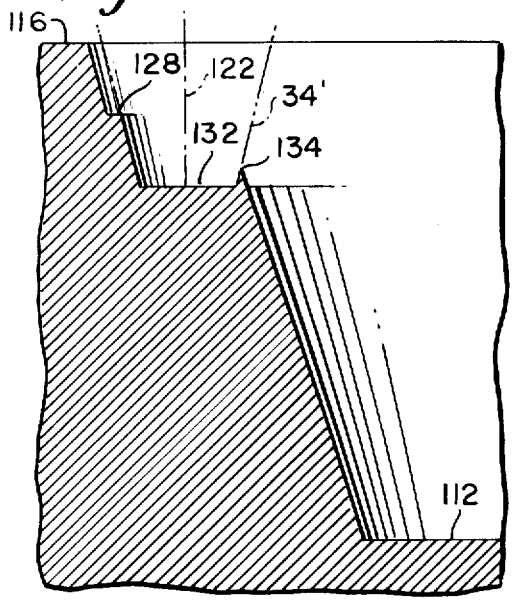
FIG. 13 is a sectional view taken along the line 13—13 in FIG. 12.
Figure 15:
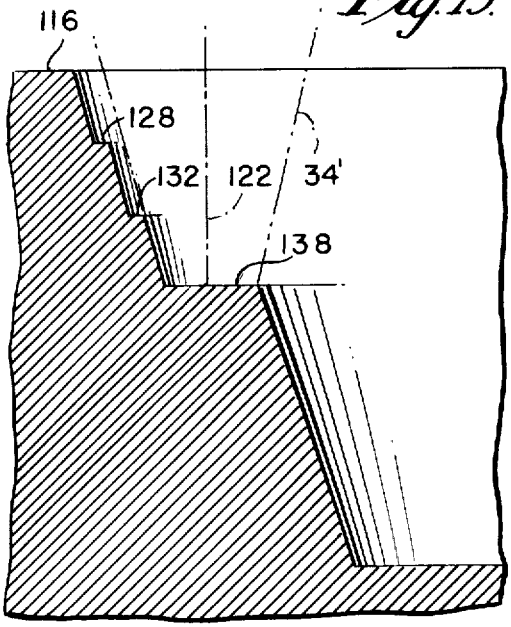
FIG. 15 is a sectional view taken along the line 5—15 in FIG. 14.
Figure 16:
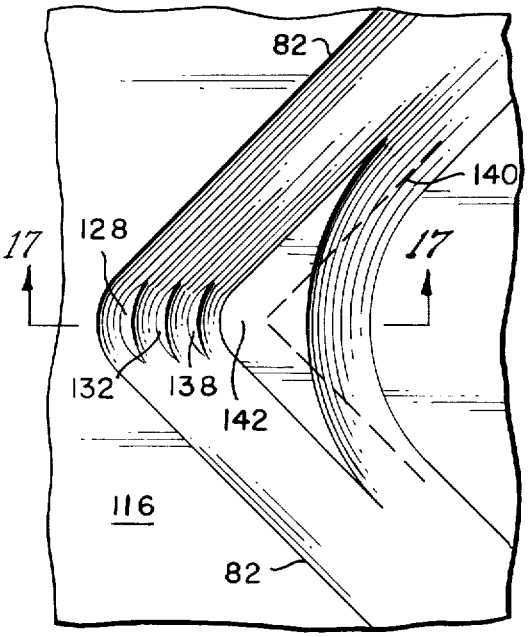
FIG. 16 is an enlarged top plan view taken within the rea 8 designated in FIG. 4 after the fine cutting tool as followed the outline of the character four at a ourth depth.

As best seen in FIGS. 12 and 13, as the axis 122 is moved parallel to lines 82, the path of which is indicated in phantom at 130, a platform 132 is engraved into the corner of the character leaving only a small portion of platform 128 remaining. It can also be seen that as the cutting tool 34 travels along the line 132, it also causes the projection 130 to be removed.

Therefore, only a small portion of the platform 128 remains which to the naked eye can hardly be seen. Also, at the second depth, a small projection 134 remains. After each of the corners that are inside corners of the character have been passed by the engraving tool 34 at the second depth, the cutting tool is again lowered to a depth intermediate of the lower surface 112 but lower than platform 132.

Figure 14:
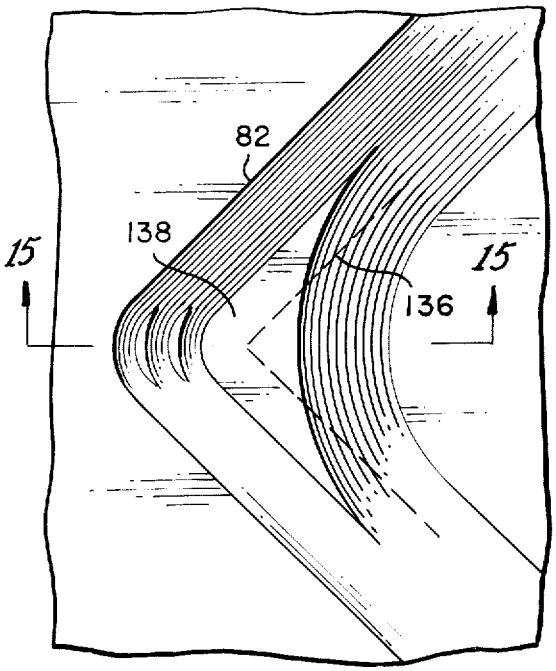
FIG. 14 is an enlarged top plan view taken in the area 8 designated in FIG. 4 after a fine cutting tool has followed the outline of the character numeral four at a third depth.

As best seen in FIG. 14, the cutting tool 34 is again moved parallel to the borderline of the character along the path which is illustrated in phantom at 136. The lowermost surface of the cutting tool 34 causes the engraving of a platform 138 at the third depth. Again, it should be noted that the axis 122 is spaced from the borderline 82 of the character by the radius of the cutting tool 34 in the plane of the land of the character 116. Thus, since the radius of the cutting tool is tapered, as the cutting tool is lowered, the radius of the cutting tool in the plane of the land 116 of the character is increasingly enlarged. Consequently, the path of movement of the axis of the cutting tool is increasingly spaced from the borderline as the cutting tool 34 is lowered.

It should be noted that the cutting tool 34 at the third depth removes most of the platform 132 including the projection 134 which remains on platform 132 after the cutting tool 34 has been moved along path 130 at the second depth.

After the cutting tool 34 has completed its path along the line 136, cutting tool 34 is lowered again to a depth below the platform 138 but intermediate of the lower surface 112. The path of movement of axis 122 of the cutting tool 34 is parallel to the borderline 82 of the engraved character as indicated in phantom at 140 in FIG. 16. The lowermost surface 114 of the cutting tool 34 causes a fourth platform 142 to be engraved at the inside corner of the character.

Figure 18:
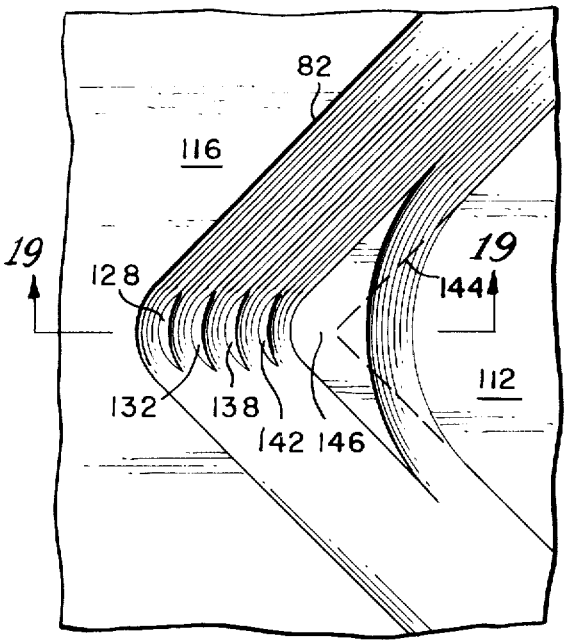
FIG. 18 is an enlarged top plan view taken in the area in FIG. 4 after the fine cutting tool has followed the utline of the character numeral four at a fifth depth.
Figure 17:
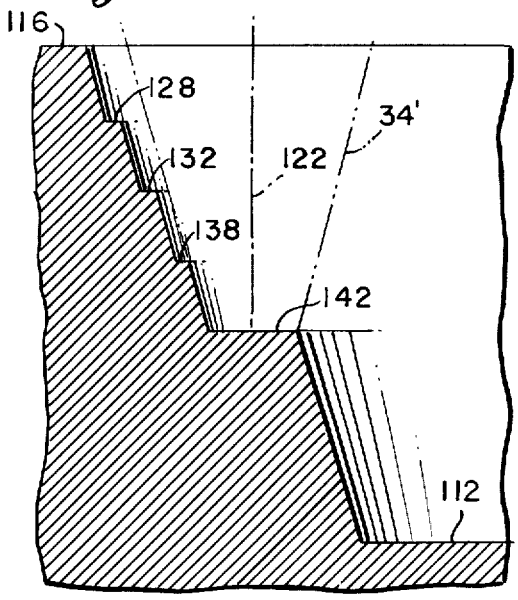
FIG. 17 is a sectional view taken along the line 7—17 in FIG. 16.
Figure 19:
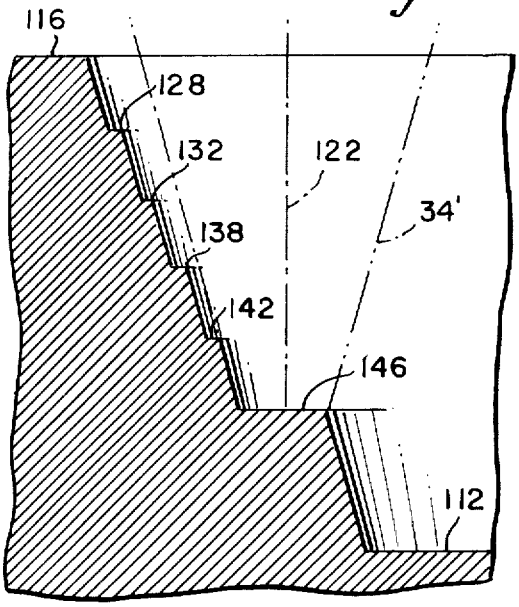
FIG. 19 is a sectional view taken along the line 9—19 in FIG. 18.

After the cutting tool 34 has completed the engraving of each of the corners of the character at the fourth level in the plane of platform 142, the cutting tool 34 is then lowered to a fifth depth intermediate of lower surface 112 as best seen in FIGS. 18 and 19. When the cutting tool 34 reaches the corner shown in FIGS. 18 and 19, the axis 122 of the cutting tool 34 follows the path which is indicated in phantom at 144 parallel to the desired borderline 82 of the engraved character. The lowermost surface of the engraving tool 34 also causes a fifth platform 146 and thereby causes a large portion of the platform 142 to be removed. Again it should be noted that the axis 122 is spaced from the borderline 82 in accordance with the radius of the cutting tool 34 in the plane of the land of the character 116.

It should also be noted that the remaining portions of platforms 128, 132, 138 and 142 are crescent shaped and remain only at the apex of the corner. That is, as best seen in FIG. 18, the platform 146 prior to the next cutting operation extends along a significant portion of the corner. However, the platforms at 128, 132, 138 and 142 that remain, remain only at the apex of the corner.

Figure 20:
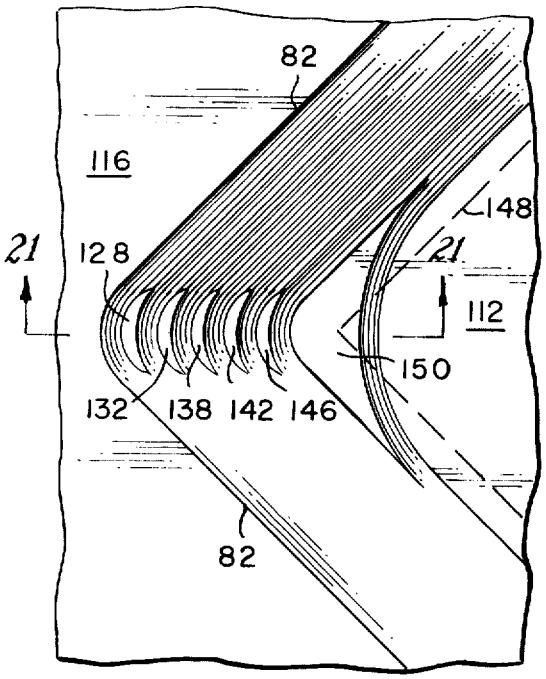
FIG. 20 is an enlarged top plan view taken in the area designated in FIG. 4 after the fine cutting tool has ollowed the outline of the character numeral four at a ifth depth.
Figure 21:
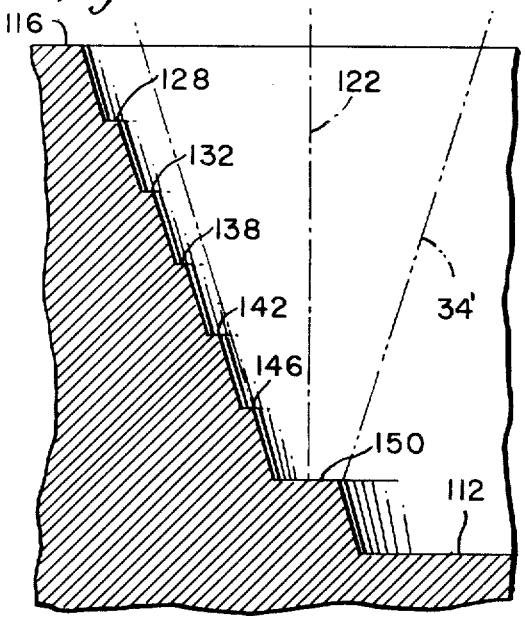
FIG. 21 is a sectional view taken along the line 1—21 in FIG. 20.

After each of the corners of the character has been engraved by the cutting tool 34 at the level of platform 146, the cutting tool 34 is lowered to a still deeper level intermediate of lower surface 112 as best seen in FIGS. 20 and 21. The cutting tool 112 again is moved parallel to the borderline 82. That is, the axis 122 is moved parallel to the borderline 82 along the path shown in phantom at 148 in FIG. 20.

The lowermost surface of the cutting tool 34 engraves a platform 150 in the corner of the character. When the cutting tool 34 moves along the platform 150, the major portion of platform 146 is removed as best seen in FIG. 20. Platform 146 is thus crescent shaped after the movement of the cutting tool 34 and is aligned with platforms 128, 132, 138 and 142.

Again it is noted that platform 150 is larger than the remaining platforms. After each of the inside corners of the character has been engraved at the level of the platform 150, the cutting tool is then lowered so that the lowermost surface of the cutting tool is substantially in the plane of the lower surface 112.

Figure 22:
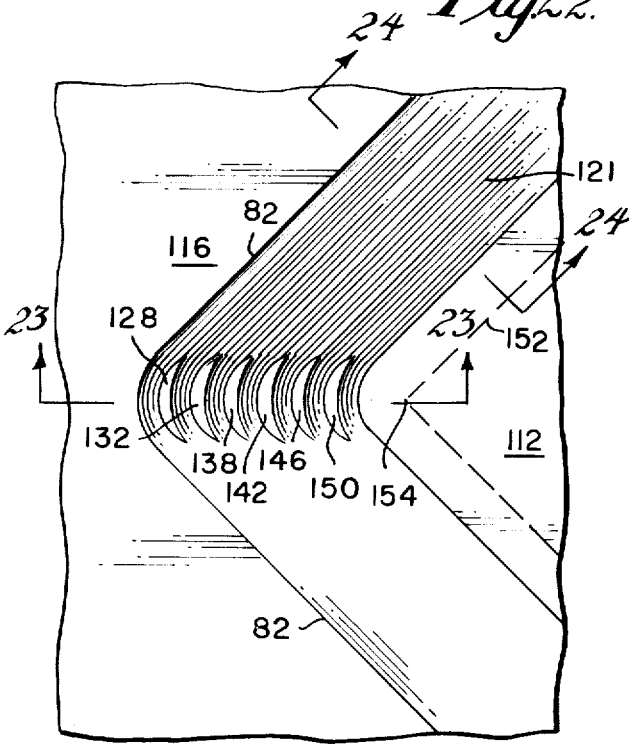
FIG. 22 is an enlarged top plan view taken within the rea 8 designated in FIG. 4 after the fine cutting tool as followed the outline of the character numeral four t a seventh depth.

The axis 122 of the cutting tool 34 then follows a path parallel to the borderline 82 which is indicated in phanatom at 152 in FIG. 22. As the cutting tool 34 is moved at the depth of the plane of the lowermost surface 112, the cutting tool removes a major portion of the platform 150 and leaves the crescent-shaped platform 150 as shown in FIG. 22.

At this lowest depth, the axis 122 is spaced from the borderline 82 in accordance with the radius of the cutting tool 34 in the plane of the land 116 of the character.

The lowermost surface 114 of cutting tool 34 continues in the plane of the lowermost surface 112 until each of the corners has been engraved in the character. After the cutting tool 34 has followed the path indicated in phantom at 152 in FIG. 22, the sidewall 121 of the character 116 is substantially planar with the exception of the apex of the corner at which the platforms 128, 132, 138, 142, 146 and 150 have a stepped configuration.

As best seen in FIG. 24, which is taken along a straight length of the character, the cutting edge of tool 34 remains parallel to the sidewall 121 of the character at each of the depths.

That is, although the cutting tool 34 was lowered to the plane of platform 128 which is shown in phantom at 128' in FIG. 24, the axis was spaced from the top surface of the character 116 by an amount equal to the radius of the cutting tool 34 in the plane of the land 116 of the character. Consequently, since the cutting tool 34 has the same gradient of cutting surface as the cutting tool 32, the cutting surface of the cutting tool 34 is parallel and tangent to the straight portion of the character at the surface 122.

As the cutting tool 34 is lowered to each of the succeeding depths which are illustrated in phantom at 132', 138', 142', 146', and 150' in FIG. 24 which are in the planes of the platforms 132, 138, 142, 146 and 150, respectively, the axis 122 of the cutting tool 34 is spaced from the top surface of the character 116 in accordance with the radius of the cutting tool in the plane of the land of the character.

Thus, as seen in FIG. 24, at each of the depths, the cutting tool 34 has its lateral surface tangent and parallel to the sidewall 121 of the character.

Figure 23:
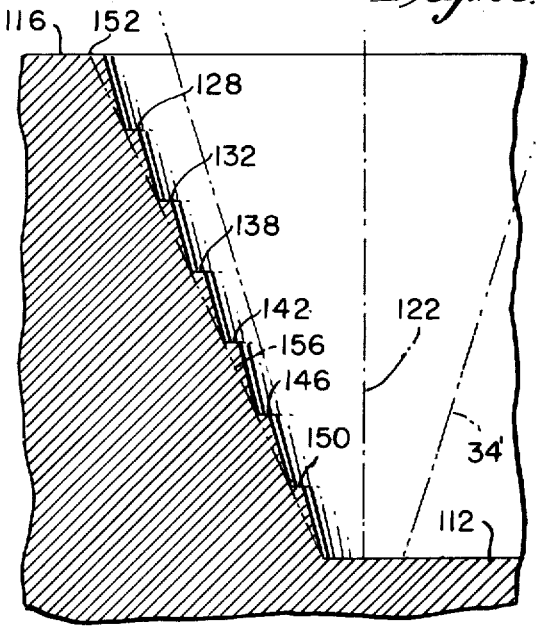
FIG. 23 is a sectional view taken along the line 3—23 in FIG. 22.

After the cutting tool 34 has engraved the final platform into lowermost surface 112 at the inside corners of the character, the cutting tool is moved to the apex of each corner so that the axis 122 is coincident with point 154 along the path 152 shown in FIG. 22. The cutting tool 134 is then moved so that the lower left-hand corner of the cutting tool, as seen in FIG. 23, moves along the path shown in phantom at 156 in FIG. 23. That is, the tool is lifted vertically and the axis moved horizontally towards the apex of the corner simultaneously. This movement of the cutting tool 34 acts to completely remove the steps caused by the platforms 128, 132, 138, 142, 146 and 150, respectively. The remaining lateral surface at the apex of the inside corner thus coincides with line 156 shown in FIG. 23 after this final operation has been performed. After the final operation in each of the corners of the character numeral four, the numeral four appears as shown in FIG. 7. The corners have been substantially reduced in radius thereby very closely resembling the idealized numeral four shown in FIG. 5.

As seen in FIG. 24, the cutting tool 34 was lowered one-seventh of the distance between the land 116 of the character and the lowermost surface 112 of the platform 80 after each step. However, it should be noted that the number of lowering steps may be varied as well as the spacing between each step without departing from the spirit of the invention.

In a preferred embodiment, the cutting tool 34 has a lowermost surface, the radius of which is approximately 0.003 inch. The land 116 of the character is spaced from the lowermost surface 112 of the platform approximately 0.021 inch and the cutting surface of the cutting tool is sloped at an angle which tapers 0.001 inch each 0.003 inch.

It can therefore be seen that the cutting tool 34 causes the inner radius of the inside corners to be reduced to a radius of 0.004 inch after the cutting tool has been lowered to the depth of platform 128. That is, the radius of the cutting tool 34 is 0.004 inch in the plane of the land of the character when the lowermost edge of the cutting tool has been lowered to the depth in the plane of platform 128. However, as seen in FIG. 23, when the cutting tool 34 is moved along the diagonal path 156 at the apex of the inside corner of the character, the lowermost edge of the cutting tool crosses the plane of the land 116 of the character at the intersection of the path line 156 and the land of the character at point 152. Since the lowermost surface of the cutting tool 34 is 0.003 inch in radius, the radius of the inside corner of the character is reduced to 0.003 inch at the land of the character or the printing surface of the character.

As set forth above, the depth of the character in the preferred embodiment is approximately 0.021 inch. Therefore, were the fine cutting tool 34 used in the conventional manner at only a single depth, the smallest that the radius at the inside corners of the character could be made is equal to the radius of the cutting tool 34 in the plane of the land 116 of the character with the lowermost end of the cutting tool at the lowermost surface 112. The radius of the cutting tool at a height of 0.021 inch from the lowermost end is 0.01 inch. It can therefore be seen that the use of the successive depths enables a considerable reduction of the radius at the inside corners of the character.

There are many characters and patterns which do not require the use of the smaller cutting tool 34. That is, the character zero has no inside corners which are less than a radius of 0.03 inch or approximately the radius produced in the land of the character by a preferred cutting tool 32. Consequently, the second cutting tool 34 is not necessary in the engraving of the character zero. therefore, the program in the control console of the numerical control device automatically starts the next character without using the second cutting tool 34.

However, in each character requiring an inside corner having a radius of less than 0.03 inch, the cutting tool 34 is moved around the periphery of the idealized character outline at the various successive depths shown in the preferred embodiment in FIGS. 8 through 24.

After the character has been engraved, the indexing device 28 shown in FIG. 2 rotates the cutting wheel 30 so that the next platform is moved to a horizontal disposition and can then be engraved by cutting tool 32.

Each of the printing wheels 30, since they are moved by the platform 24 simultaneously and in the same positions with respect to the various cutting tools 32 and 34, are engraved simultaneously. Consequently, each of the eight printing wheels have the character numeral four engraved therein simultaneously and are indexed simultaneously to the next character. Consequently, the character numeral five is then engraved into the next platform after the indexing devices 28 are rotated to the next position.

It can therefore be seen that a new and improved method of engraving characters by numerically controlled machine tools has been provided. The numerical control machine includes a plurality of pairs of cutting tools and a plurality of indexing devices so that a plurality of engravable members can be engraved simultaneously with the use of only a single control console.

A numerical control program is therefore provided in the console which enables moving a first cutting tool with respect to the desired borderline of a desired character. The program then causes a second cutting tool to automatically move with respect to the inside corners of the character. The second cutting tool is thus made to pass the corners at various successive depths to reduce the radius of the inside corners.

In addition, the large portions of area which must be removed in order to provide an embossed character are removed by a large cutting tool which is capable of long wear. When an inside corner remains in the character which is not reduced in radius enough to make the character look sharp, a second cutting tool having a smaller radius is utilized in successive steps at successive depths to reduce the radius at the apex of the inside corner.

It should be understood that this invention is not limited to numerical or alphabetic characters. This invention can be utilized to engrave characters of any shape or pattern. Moreover, as used in the specification and claims, the term "character" is generic to any pattern that may be embossed into a surface.

Without further elaboration, the foregoing will so fully illustrate my invention that others may, by applying current or future knowledge, readily adapt the same for use under various conditions of service.

What is claimed as the invention is:

1. A method of engraving inside corners of embossed characters with a numerically controlled machine tool device comprising the steps of:

providing a rotatably mounted cutting tool having a tapered cutting portion;

rotating said cutting tool;

*moving said cutting tool to an apex of an inside corner;* positioning [the] *a* tip of said cutting tool at a plurality of successive depths with respect to [the] *a* land of said character *at the apex of the inside corner;* moving said cutting tool with respect to the land of said character about [the] *a* desired outline of said character *at the apex of the inside corner* so that [the] *an* axis of said tool *is moved vertically and horizontally* at each of said depths *so that the tool* is spaced from [the] *a desired* borderline of said character a distance equal to [the] *a* radius of said tool in [the] *a* plane of said land of said character;

whereby the radius on said inside corner is reduced to the radius of said tool in the plane of said land of said character when said tip of said tool is at a depth with respect to the land of said character which is the smallest of said successive depths.

2. A numerically controlled device for engraving; said device comprising a pair of rotatable cutting tools mounted closely together, said cutting tools each having a tapered cutting portion, a support member for an engravable member and control means for moving said support means with respect to said cutting tools, said control means causing said cutting tools to follow a desired pattern with respect to said engravable member, the first of said cutting tools having a larger diameter and being moved by said control means for removing large areas of excess material about said desired pattern, said second cutting tool and said engravable member being moved with respect to each other by said control means to remove the excess material at inside corners of said pattern not accessible by said first cutting tool, said cutting tools being positioned by said control means so that [the] *an* axis of each cutting tool is spaced from [the] *an* outline of said pattern in accordance with [the] *a* radius of the cutting tool in the plane of the top surface of the engravable member, said second cutting tool being positioned at a plurality of depths so that the radius at the inside corners of said pattern can be reduced to the radius of said second cutting tool adjacent its tip.

3. The invention of claim 1 and further including the step of placing said cutting tool at [the] *said* apex of said inside corner at the largest depth of said tool with respect to the land of the character and moving said cutting tool both vertically and horizontally towards the apex of [the] *a* desired character so that [the] *an* inside corner of the character is smoothed.

4. A method of engraving embossed characters with a numerically controlled machine tool comprising the steps of:

providing a first rotatably mounted cutting tool having a tapered cutting portion;

rotating said first cutting tool;

positioning said cutting tool at a first predetermined depth with respect to [the] *a* top surface of said character equal to [the] *a* depth of said character;

moving said cutting tool with respect to said character about [the] *a* desired outline of said character so that [the] *an* axis of said tool is spaced from [the] *a* borderline of said character by a distance equal to [the] *a* radius of said tool in [the] *a* plane of the top surface of said character;

providing a second rotatably mounted cutting tool *mounted adjacent said first cutting tool and* having a tapered cutting portion with a smaller radius than said first cutting tool;

*moving said second tool with respect to said character so that said character is disposed below said second cutting tool;* positioning said second cutting tool at a second predetermined depth intermediate of said first predetermined depth; and moving said second cutting tool with respect to said character about the desired outline of said character wherein excess material outside said desired outline remains so that the axis of said second tool is spaced from said borderline of said character by a distance equal to the radius of said tool at the top surface of said character.

5. The invention of claim 4 wherein said second cutting tool is positioned at a plurality of successive depths between said second predetermined depth and said first predetermined depth and said second cutting tool is moved at each of said depths about the desired outline of said character with said axis of said second tool being spaced from said borderline of said character by a distance equal to the radius of said cutting tool in the plane of said top surface of said character at each of said depths.

6. [The invention of claim 5 and further including the step of] *A method of engraving embossed characters with a numerically controlled machine tool comprising the steps of:*

*providing a first rotatably mounted cutting tool having a tapered cutting portion;*

*rotating said first cutting tool;*

*positioning said cutting tool at a first predetermined depth with respect to a top surface of said character equal to a depth of said character;*

*moving said cutting tool with respect to said character about a desired outline of said character so that an axis of said tool is spaced from a borderline of said character by a distance equal to a radius of said tool in a plane of the top surface of said character;*

*providing a second rotatably mounted cutting tool having a tapered cutting portion with a smaller radius than said first cutting tool;*

*rotating said second cutting tool;*

*positioning said second cutting tool at a second predetermined depth intermediate of said first predetermined depth;*

*moving said second cutting tool with respect to said character about the desired outline of said character*

*wherein excess material outside said desired outline remains so that the axis of said second tool is spaced from said borderline of said character by a distance equal to the radius of said tool at the top surface of said character, said second cutting tool being positioned at a plurality of successive depths between said second predetermined depth and said first predetermined depth and said second cutting tool being moved at each of said depths about the desired outline of said character with said axis of said second tool being spaced from said borderline of said character by a distance equal to the radius of said cutting tool in the plane of said top surface of said character at each of said depths; and* positioning said second cutting tool at [the] *a* center of any excess material remaining and simultaneously moving said cutting tool upwardly and towards the desired borderline of said character so that additional excess material may be removed.

7. The invention of claim 2 wherein said device includes a plurality of said pairs of cutting tools, said support member extending adjacent each of said pairs of said cutting tools so that a plurality of engravable members may be engraved simultaneously.

8. The invention of claim 7 wherein said support members include a plurality of indexing devices and said engravable members comprise wheels having a plurality of engravable platforms about [the] *a* periphery thereof, said indexing devices adapted to rotate said wheels, said indexing devices being caused to rotate by said control means after a character has been engraved in each of said wheels.

* * * * *